(12) United States Patent
Chisholm et al.

(10) Patent No.: US 7,244,796 B2
(45) Date of Patent: *Jul. 17, 2007

(54) POLYMER COMPOSITION

(75) Inventors: Michael S. Chisholm, Yarm (GB); Andrew T. Slark, Northallerton (GB); David Sherrington, Glasgow (GB); Nial O'Brien, Glasgow (GB)

(73) Assignee: Lucite International UK Limited, Southampton, Hampshire (GB)

( * ) Notice: Subject to any disclaimer, the term of this patent is extended or adjusted under 35 U.S.C. 154(b) by 234 days.

This patent is subject to a terminal disclaimer.

(21) Appl. No.: 10/662,418

(22) Filed: Sep. 16, 2003

(65) Prior Publication Data

US 2004/0063880 A1 Apr. 1, 2004

Related U.S. Application Data

(62) Division of application No. 09/601,110, filed as application No. PCT/GB99/00617 on Mar. 11, 1999, now Pat. No. 6,646,068.

(30) Foreign Application Priority Data

Mar. 12, 1998 (GB) ................................. 9805141.0
Aug. 15, 1998 (GB) ................................. 9817728.0

(51) Int. Cl.
*C08F 2/18* (2006.01)

(52) U.S. Cl. ..................... 526/222; 526/321; 526/329.7

(58) Field of Classification Search ................ 526/222, 526/321, 329.7
See application file for complete search history.

(56) References Cited

U.S. PATENT DOCUMENTS

| | | | |
|---|---|---|---|
| 3,154,600 A | 10/1964 | Munn | |
| 3,487,062 A | 12/1969 | Boydcot et al. | |
| 4,152,506 A | 5/1979 | Novak | |
| 4,481,274 A | 11/1984 | Mitsuhashi et al. | |
| 4,711,944 A | 12/1987 | Sherwin et al. | |
| 4,839,448 A | 6/1989 | Jung et al. | |
| 4,880,889 A | 11/1989 | Jung et al. | |
| 4,988,760 A | 1/1991 | Jung et al. | |
| 5,043,404 A | 8/1991 | Mahabadi et al. | |
| 5,093,408 A | 3/1992 | Jung et al. | |
| 5,115,064 A | 5/1992 | Jung et al. | |
| 5,164,282 A | 11/1992 | Mahabadi | |
| 5,319,044 A | 6/1994 | Jung et al. | |
| 5,442,023 A * | 8/1995 | Argyropoulos et al. | ..... 526/320 |
| 5,484,866 A * | 1/1996 | Loveless et al. | ............. 526/340 |
| 5,529,719 A | 6/1996 | Cunningham et al. | |
| 5,714,261 A | 2/1998 | Siol et al. | |
| 5,726,268 A | 3/1998 | Sakamoto | |
| 5,767,211 A | 6/1998 | Guan | |
| 5,770,646 A | 6/1998 | Antonelli et al. | |
| 5,770,648 A | 6/1998 | Antonelli et al. | |
| 5,773,545 A | 6/1998 | Schade et al. | |
| 5,807,489 A | 9/1998 | Farinato et al. | |
| 5,962,613 A | 10/1999 | Schade et al. | |
| 6,646,068 B2 * | 11/2003 | O'Brien et al. | ................ 526/90 |
| 6,713,584 B1 * | 3/2004 | Chisholm et al. | ........ 526/329.7 |

FOREIGN PATENT DOCUMENTS

| | | |
|---|---|---|
| BE | 628194 | 2/1963 |
| DE | 1175439 | 8/1964 |
| DE | 1745290 | 9/1971 |
| DE | 3534874 | 4/1987 |
| DE | 3630793 | 3/1988 |
| DE | 4341072 | 6/1995 |
| EP | 0686881 | 12/1995 |
| EP | 0711787 | 5/1996 |
| EP | 103199 | 3/1998 |
| EP | 0872494 | 10/1998 |
| GB | 967051 | 8/1964 |
| GB | 2019856 | 11/1979 |
| GB | 2294467 | 5/1996 |
| JP | 60137906 | 7/1985 |
| JP | 10287721 | 10/1998 |
| WO | 85/04665 | 10/1985 |
| WO | 96/37525 | 11/1996 |

OTHER PUBLICATIONS

Billmeyer, "Textbook of Polymer Science," 3rd ed., pp. 138-141.
Alelio, "Fundamental Principles of Polymerisation," Wiley, N.Y., pp. 336-339.
Encyclopedia of Polymer Science and Engineering, vol. 2, Wiley, pp. 479-499.
Kuntstoff-Handbuch, Band IX, "Polymethacrylate," pp. 43-45.
Li et al., "Kinetics of the free-radical copolymerization of methyl methacrylate/etheylene glycol dimethacrylate: 1. Experimental investigation," *Polymer*, vo. 30, pp. 1513-1517.

* cited by examiner

*Primary Examiner*—Tae H Yoon
(74) *Attorney, Agent, or Firm*—Jones Day

(57) ABSTRACT

Branched polymers are prepared by mixing together monofunctional vinylic monomer with from 0.3 to 100% w/w of polyfunctional vinylic monomer and from 0.0001 to 50% w/w of chain transfer agent and thereafter reacting the mixture to form a polymer. The resulting branched polymers are soluble and may be used as component of surface coatings and inks as well as molding resins.

6 Claims, No Drawings

POLYMER COMPOSITION

CROSS REFERENCE TO RELATED APPLICATIONS

This application is a divisional application of U.S. Ser. No. 09/601,110, filed Dec. 8, 2000, now U.S. Pat. No. 6,646,068 which claims the benefit of International Application No. PCT/GB99/00617, filed Mar. 11, 1999 designating the United States. These applications, in their entirety, are incorporated herein by reference.

FIELD OF THE INVENTION

The present invention relates to a polymer composition, in particular to a branched polymer and a method of preparation therefor.

BACKGROUND OF THE INVENTION

Branched polymers are polymer molecules of a finite size which are branched, often having many branches. Branched polymers differ from crosslinked polymer networks which tend towards an infinite size having interconnected molecules and which are generally not soluble. Branched polymers are usually soluble in solvents which dissolve analogous linear polymers but have the advantage that solutions of branched polymers are usually less viscous than solutions of the same concentration of the corresponding linear polymer having a similar molecular weight. Therefore solutions of branched polymers are easier to handle especially at high solids content and may be made using less solvent than solutions of linear polymers. For this reason, branched polymers are useful additives to solvent-based coatings and inks, for example and they also have many other applications. Additionally, branched polymers also have a lower melt viscosity than analogous linear polymers and are useful for improving melt processability in injection moulding, compression moulding, extrusion moulding or powder coatings.

Branched polymers may be made by a two-step process in which a linear polymer containing branching sites is subjected to a further polymerisation or modification step to form branches from the branching sites. The inherent complications of a two-step process may be unattractive and make the resulting branched polymer expensive to use. Alternatively a one-step process can be used in which a polyfunctional monomer is present to provide functionality in the polymer chain from which polymer branches may grow. However, a limitation on the use of conventional one-step processes is that the amount of polyfunctional monomer must be carefully controlled, usually to substantially less than about 0.5% w/w in order to avoid extensive cross-linking of the polymer and the formation of insoluble gels. It is very unusual to avoid crosslinking using this system, especially in the absence of a solvent as diluent and/or at high conversion of monomer to polymer.

GB-A-2294467 describes a branched polymethylmethacrylate polymer which has a molecular weight of 80,000–400,000 in which the molecular weight between the branching points is between 30,000 and 1,000,000 which includes 0.05–0.2% of a polyfunctional monomer and <0.5 mole % of a chain transfer agent.

U.S. Pat. No. 5,767,211, published Jun. 16, 1998, describes the synthesis of multi-functional hyperbranched polymers by free-radical polymerisation of di- or tri-vinyl monomers in the presence of a chain transfer catalyst and a non-peroxide free radical initiator. The resulting polymers are oily, low Tg materials.

EP-A-103199 describes copolymers of t-butyl acrylate with 0.1–3% polyfunctional acrylate and 1–30% of functional comonomer made by solution polymerisation in the presence of a chain transfer agent. The functional comonomer provides an active cross-linking site used to form a coating composition crosslinked by condensation chemistry.

U.S. Pat. No. 4,880,889 describes a pre-crosslinked soluble polymer containing 10–60% of OH-functionalised monomer, 5–25% of a monomer with at least 2 olefinically unsaturated double bonds and 15–82% of further monofunctional monomers. The polymer composition is made by a solution polymerisation process in organic solvent at a low polymerised solids content of about 50% in order to produce an ungelled copolymer, using >0.5% of a polymerisation regulator. The polymers are used in crosslinked coatings where the OH group is reacted with melamine-formaldehyde crosslinkers. U.S. Pat. No. 4,988,760 and U.S. Pat. No. 5,115,064 define similar compositions which include functionalised monomers having different cross-linkable groups which include carboxyl and isocyanate.

SUMMARY OF THE INVENTION

In a first aspect of the invention, a method of preparing a branched polymer comprises the steps of mixing together a monofunctional monomer having one polymerisable double bond per molecule with from 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent and optionally a free-radical polymerisation initiator and thereafter reacting said mixture to form a polymer. In this way a soluble branched polymer may be prepared by a simple one-step process.

In a second aspect of the invention, we provide a polymer comprising residues of a monofunctional monomer having one polymerisable double bond per molecule, from 0.3–100% w/w (of the weight of the monofunctional monomer) of a polyfunctional monomer having at least two polymerisable double bonds per molecule, from 0.0001–50% w/w (of the weight of the monofunctional monomer) of a chain transfer agent and a polymerisation initiator.

For simplicity, a monomer having one polymerisable double bond per molecule will be referred to hereinafter as a monofunctional monomer (MFM) and a monomer having at least two polymerisable double bonds per molecule will be referred to as a polyfunctional monomer (PFM).

It is surprising that a soluble branched polymer may be prepared from a mixture containing a relatively large proportion of a polyfunctional monomer because such mixtures would normally be expected to produce an insoluble cross-linked polymer network. Significantly, the polymerisation can be performed in one-step in the absence of solvent and taken to high conversion of monomer to polymer (>90%) to yield a soluble branched polymer.

The polymerisation of the monomer mixture may be performed using any free-radical polymerisation method, e.g. solution, suspension, emulsion and bulk polymerisation methods may all be used. For many applications of the branched polymers of the invention, the material is required in solid form. For these applications, polymers made by solution polymerisation require the solvent to be removed before use. This increases the cost and it is difficult to remove all of the solvent providing deficiencies in utilisation of the polymer. Alternatively, when the polymer is required for use in solution form, it is necessary to conduct the polymerisation in the solvent which is to be present in the end-use application if the step of isolating the polymer is to be avoided. Therefore it may be advantageous to produce the branched polymer by a non-solution method, e.g. suspension or bulk polymerisation. It is surprising that branched polymers may be successfully formed from polyfunctional monomers in a non-solution method because the formation of gels would be expected. U.S. Pat. No. 4,880,889 teaches that special reaction conditions, including carrying out the polymerisation in solution at a relatively low solids content of about 50%, are required to obtain ungelled polymer.

Therefore in a further aspect of the invention, we provide a method of preparing a branched polymer by suspension polymerisation comprising
(i) mixing together a monofunctional monomer having one polymerisable double bond per molecule with from 0.3–100% w/w (of the weight of the monofunctional monomer) of a polyfunctional monomer having at least two polymerisable double bonds per molecule and from 0.0001–50% w/w (of the weight of the monofunctional monomer) of a chain transfer agent;
(ii) dispersing the resulting mixture as a discontinuous phase in a continuous phase in which the monomers are relatively insoluble in the presence of a dispersing agent which is capable of maintaining the mixture of monomers as a discontinuous phase in the continuous phase;
(iii) initiating polymerisation of the monomer mixture;
(iii) maintaining the dispersion of monomer in continuous phase at a reaction temperature for sufficient time to enable the monomers to react to form a polymer; and
(iv) subsequently separating the dispersed phase containing the polymer from the continuous phase.

The continuous phase is normally water. Suitable dispersing agents are well known in the art and include modified cellulose polymers (e.g. hydroxy ethyl, hydroxy propyl, hydroxy propyl methyl), polyacrylic acid, polymethacrylic acid, partially and fully neutralised versions of these acids, poly vinyl alcohol, poly(vinyl alcohol/vinyl acetate) copolymers amongst others. The dispersion of monomers in the continuous phase is normally agitated at high speed throughout the polymerisation process to help keep the dispersion stable and to enable good heat transfer between the continuous phase and the dispersed droplets or particles. As the polymerisation reaction proceeds, the monomers in the dispersed phase react to form polymer which remains within the dispersed phase. The reaction temperature may vary according to the type of monomers and initiator which is used and is typically between 20 and 150° C, for example in the range 50–120° C. Suitable reaction temperatures are well known in the art.

The monofunctional monomer may comprise any monomer which can be polymerised by a free-radical mechanism such as methacrylates and acrylates, styrene and derivatives thereof (styrenics), vinyl acetate, maleic anhydride, itaconic acid, N-alkyl (aryl) maleimides and N-vinyl pyrrolidone, vinyl pyridine, acrylamide, methacrylamide, N,N-dialkylmethacrylamides and acrylonitrile. Vinyl monomers, such as styrenics, acrylates and methacrylates, (meth)acrylamides and acryionitrile are preferred monomers. Mixtures of more than one monofunctional monomer may be used to produce a random, alternating block or graft copolymer.

Examples of suitable monofunctional (meth)acrylate monomers include lower alkyl, i.e. $C_1$ to $C_{20}$ alkyl, (meth) acrylates, e.g. methyl (meth)acrylate, ethyl (meth)acrylate, propyl (meth)acrylate, n-butyl (meth)acrylate, iso-butyl (meth)acrylate, t-butyl (meth)acrylate, 2-ethyl hexyl (meth) acrylate, octyl (meth)acrylate or dodecyl (meth)acrylate. Additionally, cyclic alkyl monomeric species may be used such as cyclohexyl (meth)acrylate, isobornyl (meth)acrylate and dicyclopentenyl (meth)acrylate. Functional monomers such as methacrylic acid and acrylic acid, hydroxy alkyl methacrylates such as hydroxy ethyl (meth)acrylate, hydroxypropyl (meth)acrylate and hydroxybutyl (meth)acrylate, glycidyl (meth)acrylate, dialkyl aminoalkyl (meth)acrylates such as dimethyl aminoethyl (meth)acrylate, diethyl aminoethyl (meth)acrylate, dimethyl aminopropyl (meth)acrylate and diethyl aminopropyl (meth)acrylate. By (meth)acrylate, we mean that either the methacrylate or the analogous acrylate may be used.

By polyfunctional monomer, we mean a monomer which has at least two polymerisable double bonds per molecule. We also include in the term polyfunctional monomer reactive oligomers or reactive polymers or pre-polymers having at least two double bonds polymerisable via a free-radical mechanism. Examples of suitable bifunctional monomers include: ethylene glycol di(meth)acrylate, hexanediol di(meth)acrylate, tripropylene glycol di(meth)acrylate, butanediol di(meth)acrylate, neopentyl glycol di(meth)acrylate, diethylene glycol di(meth)acrylate, triethylene glycol di(meth)acrylate, dipropylene glycol di(meth)acrylate, allyl (meth)acrylate, divinyl benzene and derivatives thereof. Trifunctional examples include: tripropylene glycol tri (meth)acrylate, trimethylol propane tri(meth)acrylate, pentaerythritol tri(meth)acrylate. Tetrafunctional monomers such as pentaerythritol tetra(meth)acrylate and hexafunctional monomers, e.g. dipentaerythritol hexa(meth)acrylate may also be used. Optionally, the polyfunctional monomer may comprise a mixture of more than one polyfunctional compound.

The branched polymer may be formed using a reactive oligomer or reactive polymer or pre-polymer having at least two double bonds per molecule which are polymerisable via a free-radical mechanism as the, or one of the, polyfunctional monomers. We include such functional polymers and oligomers in the term "polyfunctional monomer" because the polymerisable functional groups enable the reactive oligomer or reactive polymer to polymerise into the growing polymer molecules in the same way as a simple polyfunctional monomer. Typical reactive oligomers include, but are not limited to, epoxy-(meth)acrylates, polyether(meth)acrylates, polyester-(meth)acrylates and urethane-(meth)acrylates. Typical reactive polymers include addition or condensation polymers such as a styrene or acrylic copolymers containing pendant polymerisable (meth)acrylate groups or unsaturated polyesters. The molecular weight range of the oligomer or reactive polymer may vary from 500–500,000 g/mole. When such reactive oligomers or polymers are used to provide at least a part of the polyfunctional monomers the amount of polyfunctional material included in the reaction process is normally much greater than when simple monomers are used, due to the rather higher molecular weight of such materials.

The amount of polyfunctional monomer present may be up to 100 wt % of the total initial monofunctional monomer concentration. Preferably, the amount of polyfunctional monomer present is 0.3–25%, e.g. 0.5–10% based on monofunctional monomer when the polyfunctional monomer is a simple monomer, i.e. not a reactive oligomer or polymer.

When reactive polymers or oligomers are used then the concentration may vary up to about 50% w/w or more if a high molecular weight reactive polymer or oligomer is used.

The chain transfer agent may be chosen from a range of thiol compounds including monofunctional and polyfunctional thiols. Monofunctional thiols include, but are not limited to, propyl mercaptan, butyl mercaptan, hexyl mercaptan, octyl mercaptan, dodecyl mercaptan, thioglycollic acid, mercaptopropionic acid, alkyl thioglycollates e.g. 2-ethyl hexyl thioglycollate or octylthioglycollate, mercaptoethanol, mercaptoundecanoic acid, thiolactic acid, thiobutyric acid. Polyfunctional thiols include trifunctional compounds such as trimethylol propane tris(3-mercaptopropionate), tetrafunctional compounds such as pentaerythritol tetra(3-mercaptopropionate), pentaerythritol tetrathioglycollate, pentaerythritol tetrathiolactate, pentaerythritol tetrathiobutyrate; hexafunctional compounds such as dipentaerythritol hexa(3-mercaptopropionate), dipentaerythritol hexathioglycollate; octafunctional thiols such as tripentaerythritol octa(3-mercaptopropionate), tripentaerythritol octathioglycollate. The use of polyfunctional thiols is a useful way to increase the degree of branching in the polymer. Optionally, the chain transfer agent may comprise a mixture of more than one type of compound.

The amount of chain transfer agent present may be up to 50 wt % of the total initial monofunctional monomer concentration. In a first embodiment, the amount of chain transfer agent present is 0.1–20% w/w, e.g. 0.5–10% w/w based on monomer. The branched polymer is made using an appropriate amount of chain transfer agent to prevent the formation of a substantial amount of insoluble cross-linked polymer. The majority of the polymer produced is soluble, even at high conversion of monomer to polymer. A small amount of cross-linked polymer may be formed but the reaction conditions and level of chain transfer agent should preferably be chosen such that the amount of cross-linked polymer formed is <10% (w/w), more preferably <5% (w/w), more preferably <2.5% (w/w) and optimally 0% (w/w). We have found that the use of secondary mercaptans as chain transfer agents leads to a reduction in the level of crosslinked polymer and reduces the formation of microgels in solutions of the resulting branched polymers. Therefore; for certain polymerisation systems, the use of secondary mercaptan chain transfer agents may be preferred. Chain transfer agents comprising secondary mercaptans are particularly preferred when the polymerisation is carried out in bulk or suspension polymerisation processes.

Alternative chain transfer agents may be any species known to reduce molecular weight in the conventional free-radical polymerisation of vinyl monomers. Examples include sulphides, disulphides, halogen-containing species. Also, catalytic chain transfer agents such as cobalt complexes, e.g. cobalt (II) chelates such as cobalt porphyrin compounds are useful chain transfer agents for the invention. Suitable cobalt chelates are known in the art and are described in WO 98/04603. A particularly suitable compound is bis(borondifluorodimethylglyoximate) cobaltate (II) also known as CoBF. Catalytic chain transfer agents may be used in relatively low concentrations compared to conventional thiol chain transfer agents, e.g. <0.5% preferably <0.1% by weight (on monofunctional monomer), since they are generally highly effective at low concentrations. We have surprisingly found that catalytic chain transfer compounds based on cobalt complexes may be very effectively used at concentrations of less than 0.05% (500 ppm) w, e.g. 0.0001–0.01% w (1–100 ppmw) based on monofunctional monomer in the polymerisation process of the present invention to give soluble branched polymers.

The polymerisation of the monomers may be initiated by any suitable method of generating free-radicals such as by thermally induced decomposition of a thermal initiator such as an azo compound, peroxide or peroxyester. Therefore the polymerisation mixture also preferably contains a polymerisation initiator which may be any of those known and conventionally used in free-radical polymerisation reactions, e.g. azo initiators such as azobis(isobutyronitrile) (AIBN), azobis(2-methylbutyronitrile), azobis(2,4-dimethylvaleronitrile), azobis(4-cyanovaleric acid), peroxides such as dilauroyl peroxide, tert-butyl peroxyneodecanoate, dibenzoyl peroxide, cumyl peroxide, tert-butyl peroxy-2-ethyl hexanoate, tert-butyl peroxy diethyl acetate and tert-butyl peroxy benzoate.

The branched polymers of the invention are useful as components of a number of surface coatings applications where a diluent is used to apply the surface coating. Applications where the diluent is an organic solvent include paints, clear varnishes, inks and adhesives. The branched polymers are also useful as components in radiation-curable formulations where the diluent is a polymerisable liquid which polymerises in the presence of radiation (such as UV, electron-beam and infra-red). The branched polymers are also useful in coatings applications such as powder coatings and hot-melt adhesives (conventional and radiation-cured) which do not require the use of a diluent. In addition to surface coatings applications, the branched polymers of the invention are useful for the preparation of bulk polymer articles via injection moulding, compression moulding or extrusion moulding. The branched polymers may also be used as constituents of compositions for use in other applications in which acrylic polymers are cured in situ, e.g. in polymer-in-monomer syrups for e.g. reactive flooring, filled moulding compositions for moulding of e.g. kitchen sinks, worktops, acrylic sheets, shower trays, curable cements, photoresists, adhesives (including pressure-sensitive adhesives) etc. The branched copolymer of the invention may be used alone or blended with other polymers in the end-use application.

In a further aspect of the invention we provide a surface coating composition comprising a solution of a branched polymer which comprises residues of a monofunctional monomer and from 0.3–100% w/w (of the weight of the monofunctional monomer) of a polyfunctional monomer and from 0.0001–50% w/w (of the weight of the monofunctional monomer) of a chain transfer agent and a polymerisation initiator. The surface coating composition typically also may include polymerisable species such as monomers, functionalised oligomers and copolymers and other compounds such as cross-linking species, polymers, curing agents, colourants, solvents, dispersing aids, lubricants, processing aids, fillers, carrier fluids, toughening agents, plasticisers, flexibilisers, stabilisers and other components as appropriate.

In a further aspect of the invention, we provide a polymeric article or coating comprising a branched polymer which comprises monofunctional monomer having one polymerisable double bond per molecule, from 0.3–100% w/w (of the weight of the monofunctional monomer) of a polyfunctional monomer having at least two polymerisable double bonds per molecule, from 0.0001–50% w/w (of the weight of the monofunctional monomer) of a chain transfer agent and a polymerisation initiator. The polymeric article or coating may also contain polymerisable species such as monomers, functionalised oligomers and copolymers and other compounds such as cross-linking species, polymers, curing agents, colourants, solvents, dispersing aids, lubricants, processing aids, fillers, carrier fluids and toughening agents, plasticisers, flexibilisers, stabilisers and other components or residues thereof.

The weight average molecular weight (Mw) of the branched polymer is preferably in the range 2,000–500,000. For certain applications, e.g. where dissolution of the branched polymer is required, a lower molecular weight, e.g. in the range 2,000–200,000 may be preferred.

The invention will now be further described with reference to the following Examples. In all examples, MFM refers to monofunctional monomer, PFM to polyfunctional monomer and CTA to chain transfer agent. The quantities of materials used in the polymerisations are calculated as w/w with respect to the total concentration of monofunctional monomer. The weights of polyfunctional monomer, chain transfer agent and initiator used, described as a weight % is calculated as a percentage of the weight of total monofunctional monomer. For example, for a polymerisation of MFM involving 3% PFM and 4% CTA, 3 g of PFM and 4 g of CTA would be added to 100 g of MFM.

EXAMPLES

Preparation of Polymers by Suspension Polymerisation

Polymers were prepared by suspension polymerisation of a monomer mixture containing monofunctional and polyfunctional monomers in the presence of the chain transfer agent, e.g. dodecyl mercaptan (DDM), a dispersant (hydroxy ethyl cellulose, 1–2% by weight on monomer) and a free-radical initiator (AIBN, 1% by weight on monomer) in deionised water. In a typical preparation, 2000 ml deionised water and about 4 g hydroxy ethyl cellulose (HEC) were added to a 5000 ml baffled flask. Nitrogen was purged through the water for 30 minutes to remove dissolved oxygen and the flask was agitated with a stainless steel stirrer set at 1400 rpm. The CTA was dissolved into the monomer mixture (500 g of the MFM mixed with the required amount of PFM), and then added to the reaction flask followed by the AIBN. The reaction flask was heated at full power to 75° C. The reaction was allowed to proceed until the exotherm began to subside. The maximum polymerisation temperature was typically 90° C. The flask was left to heat treat for 1 hr. The flask and contents were cooled with air to 40° C. and the contents were dewatered by centrifuging. The polymers were dried in either an oven at 40° C. or in a fluidised bed dryer.

Preparation of Polymers by Solution Polymerisation

Polymers were made by solution polymerisation by dissolving MFM in toluene (33% w/w), adding the chosen concentration of polyfunctional monomer (PFM) and chain transfer agent (CTA) and initiating polymerisation using AIBN (1% by weight based on monomer). Polymerisations were performed at 80° C. in an oil bath under nitrogen using a condenser. After 7 hours polymerisations were terminated by cooling. The resulting polymers were isolated by precipitation in hexane and dried.

Characterisation by GPC Method 1

The molecular weight was measured by Gel Permeation Chromatography using mixed gel columns and narrow molecular weight PMMA standards for calibration. Chloroform was used as the mobile phase with a flow rate of 1 ml/min and an infra-red detector. The weight average molecular weight (Mw), the number average molecular weight (Mn) and the polydispersity (Mw/Mn) were determined.

Characterisation by GPC Method 2

Polymers were characterised using Triple Detector GPC (TDGPC). Chain branching significantly alters the molecular size to molecular weight relationship. The triple detector enhancement to GPC enables the measurement of molecular size concurrently with molecular weight without recourse to a conventional calibration. Initially, the relationship is standardised for a linear control polymer and this becomes the starting point for all subsequent branching calculations. Comparison of the data from the branched polymer with that of the linear control enables detailed determination of the branching variation as a function of molecular weight. The instrument used in this study was by Viscotek and incorporates a Laser Differential Refractometer, a Differential Viscometer, and a Right Angle Laser Light Scattering photometer. The data acquisition and reduction software was Trisec Version 3, also by Viscotek. A styrene-divinyl benzene, mixed bed column from Polymer Standards Service (PSS) was used with chloroform as the eluent at a flow rate of 1.0 ml/min. In addition to molecular weight information, GPC method 2 determines g', alpha, log K and Bn, where Bn is the average number of branches per molecule. Bn=0 for a linear polymer and Bn>0 for a branched polymer; g' is the Zimm branching factor equivalent to the ratio of mean square radius of gyration of the (branched) material to that of linear material of the same molecular weight (g'=1.0 for a linear polymer and g'<1.0 for a branched polymer). Alpha and logK are determined from the relationship between viscosity and molecular weight from the Mark-Houwink equation, $\bar{\eta}=KM^{\alpha}$, $\log[\bar{\eta}]=\alpha \log M + \log K$.

Determination of Solution Viscosities

The viscosity of a 30% (w/w) solution of the polymer in toluene was measured using a Brookfield Viscometer at a temperature of 25° C. using an LV2 spindle.

Examples 1–4

The polymerisation was carried out by suspension polymerisation using a monomer mixture of methyl methacrylate (MMA) as MFM and tripropylene glycol diacrylate (TPGDA) as PFM, yielding a branched polymer according to the invention. The amount of TPGDA used and the properties of the resulting polymer (characterised by GPC method 2) are shown in Table 1.

Examples 5–9 (Comparative)

The polymer was made as described above but using only MMA as the monomer. The resulting polymer was essentially linear. For a linear polymer Bn=0, g'=1.0, $\alpha$=0.68 and logK=−3.65

TABLE 1

| Examp. | DDM (wt %) | TPGDA (wt %) | solty in toluene | Brookfield viscosity (cP) | Mn (g.mol$^{-1}$) | Mw (g.mol$^{-1}$) | Mw/Mn | Bn | g' | α | logK |
|---|---|---|---|---|---|---|---|---|---|---|---|
| 1 | 4 | 0.75 | good | 19 | 5,190 | 12,600 | 2.4 | 0.92 | 0.87 | 0.59 | −3.31 |
| 2 | 4 | 1.5 | good | 22 | 2,670 | 14,300 | 5.4 | 0.18 | 0.97 | 0.51 | −2.92 |
| 3 | 4 | 3 | good | 34 | 1,370 | 56,100 | 41 | 3.32 | 0.85 | 0.36 | −2.25 |
| 4 | 4 | 3.5 | mod | 46 | 5,850 | 150,100 | 25.7 | 7.6 | 0.62 | 0.5 | −3.04 |
| 5 | 0.1 | 0 | good | 2,164 | 60,760 | 157,700 | 2.6 | | | | |
| 6 | 0.2 | 0 | good | 716 | 36,690 | 81,900 | 2.2 | | | | |
| 7 | 0.3 | 0 | good | 185 | 30,890 | 58,800 | 1.9 | | | | |
| 8 | 1 | 0 | good | 71 | 20,690 | 39,700 | 1.9 | 0 | 1.0 | 0.68 | −3.65 |
| 9 | 2 | 0 | good | 31 | 10,380 | 19,500 | 1.9 | | | | |

Examples 10–12 (Comparative)

The polymerisation was carried out using a monomer mixture of MMA and 1, 2 and 3% w/w TPGDA in the absence of chain transfer agent. The resulting polymers were insoluble, demonstrating that a crosslinked polymer results in the absence of chain transfer agent, even at relatively low levels of polyfunctional monomer.

Examples 13–20

Polymers were made in the same way as Examples 1–4 using different relative amounts of TPGDA and DDM. The properties are shown in Table 2.

TABLE 2

| Ex | DDM (wt %) | TPGDA (wt %) | solty in toluene | Brookfield viscosity (cP) | Mn (g.mol$^{-1}$) | Mw (g.mol$^{-1}$) | Mw/Mn | Bn | g' | α | logK |
|---|---|---|---|---|---|---|---|---|---|---|---|
| 13 | 1 | 0.25 | good | 85 | 16,700 | 40,200 | 2.4 | 0.17 | 0.97 | 0.69 | −3.88 |
| 14 | 1 | 0.5 | good | 123 | 17,700 | 66,300 | 3.8 | 1.25 | 0.83 | 0.63 | −3.47 |
| 15 | 1 | 0.75 | good | 140 | 16,800 | 131,400 | 7.8 | 2.68 | 0.72 | 0.59 | −3.32 |
| 16 | 1 | 1 | good | 336 | 10,300 | 488,600 | 47.4 | 5.99 | 0.73 | 0.44 | −2.55 |
| 17 | 2 | 0.5 | good | 39 | 7,780 | 22,200 | 2.9 | 0.15 | 0.98 | 0.63 | −3.42 |
| 18 | 2 | 1 | good | 50 | 13,700 | 35,100 | 2.6 | 1.42 | 0.8 | 0.61 | −3.41 |
| 19 | 2 | 1.5 | good | 75 | 11,500 | 80,100 | 7 | 3.21 | 0.72 | 0.48 | −2.86 |
| 20 | 2 | 2 | good | 200 | 5,820 | 338,500 | 58.2 | 9.95 | 0.63 | 0.44 | −2.67 |

The measured properties show that the polymers are branched and have a wide variety of molecular weights. Comparison with Examples 5–8 show that these polymers produce a lower solution viscosity than linear polymers with similar Mw.

Examples 21–26

Polymers were made by solution polymerisation as described above using different polyfunctional monomers (PFM). The polymers were characterised by GPC method 1. The following polyfunctional monomers were used:
  TPGDA is tripropylene glycol diacrylate
  TMPTA is trimethylol propane triacrylate
  PETA is pentaerythritol tetraacrylate
  DPEHA is dipentaerythritol hexaacrylate
  EGDMA is ethylene glycol dimethacrylate
The results show that soluble, branched polymers were obtained using monomers of different functionality.

Examples 27–30

Polymers were made by solution polymerisation using the following different chain transfer agents (CTA):
  TRIMP is trimethylol propane tris(3-mercaptopropionate)
  PETMP is pentaerythritol tetramercaptopropionate
  DPEHTG is dipentaerythritol hexathioglycollate
  TPEOTG is tripentaerythritol octathioglycollate
The polymers were characterised by GPC method 1 and the results are shown in Table 3. The results show that chain transfer agents with a varying plurality of thiol groups can be used with a polyfunctional monomer to make soluble branched polymers.

Examples 31–33

The polymers were made by solution polymerisation using the polyfunctional monomers (PFM) and polyfunctional chain transfer agents shown in Table 3. The results (by GPC method 1) show that various combinations of polyfunctional monomers and polyfunctional chain transfer agents, both with a varying plurality of acrylate or thiol can be used to make soluble, branched polymers

Examples 34–36

These polymers were made by solution polymerisation using DDM and TPGDA and analysed by GPC method 1. The results are shown in Table 3.

TABLE 3

| Example | CTA type | CTA (wt %) | PFM type | PFM (wt %) | solubility in toluene | Mn (g.mol$^{-1}$) | Mw (g.mol$^{-1}$) | Mw/Mn |
|---|---|---|---|---|---|---|---|---|
| 21 | DDM | 2 | TPGDA | 1.5 | good | 6,750 | 18,020 | 2.67 |
| 22 | DDM | 2 | TMPTA | 1.48 | good | 7,190 | 26,510 | 3.89 |
| 23 | DDM | 2 | PETA | 1.76 | good | 9,080 | 65,504 | 7.22 |
| 24 | DDM | 2 | DPEHA | 2.89 | good | 9,500 | 200,432 | 21.11 |
| 25 | DDM | 2 | EGDMA | 1 | good | 7,850 | 26,638 | 3.39 |
| 26 | DDM | 2 | EGDMA | 2 | good | 10,034 | 99,712 | 9.93 |
| 27 | TRIMP | 3.98 | TPGDA | 1.5 | good | 6,530 | 14,780 | 2.26 |
| 28 | PETMP | 4.88 | TPGDA | 1.5 | good | 5,990 | 13,120 | 2.19 |
| 29 | DPEHTG | 6.98 | TPGDA | 1.5 | good | 5,700 | 13,180 | 2.31 |
| 30 | TPEOTG | 9.64 | TPGDA | 1.5 | good | 6,480 | 14,020 | 2.16 |
| 31 | TRIMP | 3.98 | TMPTA | 1.48 | good | 6,850 | 22,460 | 3.28 |
| 32 | PETMP | 4.88 | PETA | 1.76 | good | 6,350 | 24,980 | 3.94 |
| 33 | DPETHG | 6.98 | DPEHA | 2.89 | good | 8,010 | 53,470 | 6.67 |
| 34 | DDM | 2 | TPGDA | 3 | good | 8,380 | 27,330 | 3.26 |
| 35 | DDM | 2 | TPGDA | 4.5 | good | 8,400 | 46,040 | 5.48 |
| 36 | DDM | 2 | TPGDA | 6 | good | 9,530 | 103,320 | 10.84 |

Examples 37–39

Branched polymers were made according to the invention using CoBF, a catalytic chain transfer agent. The MFM was MMA. The resulting branched polymers were soluble in toluene without microgel formation. The molecular weights were determined by GPC method 1.

TABLE 4

| Example | TPGDA wt % | COBF (ppm) | AIBN (wt %) | polymerisation method | Mn (g/mole) | Mw (g/mole) |
|---|---|---|---|---|---|---|
| 37 | 1.5 | 10 | 1 | solution | 24,388 | 90,416 |
| 38 | 1.5 | 20 | 1 | solution | 12,220 | 46,070 |
| 39 | 2 | 75 | 1 | suspension | 5,200 | 28,400 |

Polymerisations similar to those in examples 37 and 38 were also performed with 5 and 2.5 ppm CoBF resulting in viscous polymer solutions without microgel formation.

Examples 40–53

The polymerisations were carried out using MMA as monofunctional monomer with acrylate-functionalised oligomers as PFM of different types in varying quantities, as shown below in Table 5. The resulting polymers were all soluble. Molecular weights were determined by GPC method 1.

Ebecryl™ 4858 is an aliphatic urethane-acrylate oligomer with 2 acrylate functional groups and a molecular weight of 450 g/mole, supplied by UCB Chemicals.

Ebecryl™ 210 is an aromatic urethane-acrylate oligomer with 2 acrylate functional groups and a molecular weight of 1500 g/mole, supplied by UCB Chemicals.

Ebecryl™ 230 is an aliphatic urethane-acrylate oligomer with 2 acrylate functional groups and a molecular weight of 5000 g/mole, supplied by UCB Chemicals.

Ebecryl™ 605 is an epoxy-acrylate oligomer with 2 acrylate functional groups per molecule and a molecular weight of 500 g/mole, supplied by UCB Chemicals.

Ebecryl™ 81 is a polyester-acrylate oligomers with an average of 2.5 acrylate functional groups per molecule and a molecular weight of 600 g/mole, supplied by UCB Chemicals.

Ebecryl™ 80 is a polyether-acrylate oligomer with 4 acrylate functional groups per molecule and a molecular weight of 1000 g/mole, supplied by UCB Chemicals.

TABLE 5

| Example | Oligomer | Oligomer (wt %) | DDM (wt %) | AIBN (wt %) | method* | Mn (g/mole) | Mw (g/mole) |
|---|---|---|---|---|---|---|---|
| 40 | Ebecryl 605 | 2.5 | 2 | 1 | sol | 8,613 | 28,384 |
| 41 | Ebecryl 80 | 5 | 2 | 1 | sol | 5,706 | 20,165 |
| 42 | Ebecryl 81 | 3 | 2 | 1 | sol | 6,279 | 18,012 |
| 43 | Ebecryl 4858 | 2.25 | 2 | 1 | sol | 8,405 | 28,257 |
| 44 | Ebecryl 4858 | 4.5 | 2 | 1 | sol | 8,530 | 56,716 |
| 45 | Ebecryl 4858 | 6.75 | 2 | 1 | sol | 12,165 | 437,690 |
| 46 | Ebecryl 210 | 7.5 | 2 | 1 | sol | 9,043 | 32,846 |
| 47 | Ebecryl 210 | 10 | 2 | 1 | sol | 8,813 | 42,930 |
| 48 | Ebecryl 210 | 12 | 2 | 1 | sol | 10,033 | 52,594 |
| 49 | Ebecryl 230 | 25 | 2 | 1 | sol | 8,270 | 31,125 |
| 50 | Ebecryl 230 | 30 | 2 | 1 | sol | 10,475 | 76,464 |
| 51 | Ebecryl 230 | 40 | 2 | 1 | sol | 12,081 | 44,177 |
| 52 | Ebecryl 230 | 18 | 3.5 | 1.2 | sus | 6,400 | 22,600 |
| 53 | Ebecryl 230 | 43 | 8.6 | 1.4 | sus | 3,500 | 13,300 |

*sol = solution polymerisation, sus = suspension polymerisation

Examples 54–57

These polymerisations were conducted using a mixture of more than one monofunctional monomer (MFM) and TPGDA as PFM. Molecular weights were determined by GPC method 1.

TABLE 6

| Example | MFM | MFM ratio | TPGDA (wt %) | DDM (wt %) | AIBN (wt %) | method* | Mn (g/mole) | Mw (g/mole) |
|---------|-----|-----------|--------------|------------|-------------|---------|-------------|-------------|
| 54 | MMA + IBMA | 50:50 | 5 | 2 | 1 | sol | | |
| 55 | MMA + BMA + MA | 65:30:5 | 3 | 4 | 1 | sus | 5,950 | 33,750 |
| 56 | MMA + BMA + MA | 65:30:5 | 6 | 8 | 1 | sus | 3,700 | 17,150 |
| 57 | MMA + BMA | 75:25 | 3 | 4 | 1 | sus | 6,300 | 32,000 |

MMA is methyl methacrylate, BMA is n-butyl methacrylate, IBMA is isobornyl methacrylate. MA is methacrylic acid.

Examples 58–61

Branched polymers were made by suspension polymerisation using a monofunctional monomer mixture of 60% BMA, 39% MMA and 1% MA with PETA as PFM at 0.5% based on total MFM 1.2 wt % AIBN initiator and 0.5 wt % Versicol™ S19 suspension stabiliser. Thiolactic acid (TLA) chain transfer agent was used with or instead of other mercaptans. We observed that for those mixtures in which microgels tended to form, this tendency was greatly reduced or eradicated when TLA, a secondary mercaptan, was present. Molecular weights were determined by GPC method 1.

TABLE 7

| Example | PETA (wt %) | PETMP (wt %) | DDM (wt %) | TLA (wt %) | Mn (g/mole) | Mw (g/mole) | microgel | viscosity (cP) |
|---------|-------------|--------------|------------|------------|-------------|-------------|----------|----------------|
| 58 | 0.5 | 0 | 2 | 0 | 9,830 | 22,800 | minor | 134.1 |
| 59 | 0.5 | 0 | 0 | 2 | 12,850 | 45,670 | none | 387.5 |
| 60 | 0.5 | 0 | 0 | 1 | 24,762 | 159,212 | none | 1,665 |
| 61 | 0.5 | 0 | 1.5 | 0.25 | 25,440 | 57,430 | none | 190 |
| 62 | 1 | 6 | 0 | 0.5 | 9,100 | 26,400 | none | 62 |
| 63 | 1 | 6 | 0 | 1 | 7,050 | 22,250 | none | 62 |

What is claimed is:

1. A non-solution method of preparing a soluble branched polymer comprising mixing together a monofunctional monomer having one polymerisable double bond per molecule with from 0.5–100% w/w, based on the weight of the monofunctional monomer, of a polyfunctional monomer having at least two polymerisable double bonds per molecule and from 0.0001–50% w/w, based on the weight of the monofunctional monomer, of a chain transfer agent and optionally a free-radical polymerisation initiator and thereafter reacting said mixture to form said polymer, such that the conversion of monomer to polymer is greater than 90% and wherein the weight average molecular weight (Mw) of the branched polymer is in the range of 2,000 to 200,000, wherein said reacting of said mixture to form said polymer is performed in one step.

2. A non-solution method of preparing a soluble branched polymer comprising mixing together a monofunctional monomer at least comprising a methacrylate monomer, said monofunctional monomer having one polymerisable double bond per molecule with from 0.5–100% w/w, based on the weight of the monofunctional monomer, of a polyfunctional monomer having at least two polymerisable double bonds per molecule and from 0.0001–50% w/w, based on the weight of the monofunctional monomer, of a chain transfer agent and optionally a free-radical polymerisation initiator and thereafter reacting said mixture to form said polymer, such that the conversion of monomer to polymer is greater than 90% and wherein the polyfunctional monomer is at least one monomer selected from the group consisting of ethylene glycol di(meth)acrylate, tripropylene glycol di(meth)acrylate, butanediol di(meth)acrylate, neopentyl glycol di(meth)acrylate, diethylene glycol di(meth)acrylate, triethylenene glycol di(meth)acrylate, dipropylene glycol diethylene glycol di(meth)acrylate, triethylene glycol di(meth)acrylate, dipropylene glycol di(meth)acrylate, allyl (meth) acrylate, divinyl benzene, tripropylene glycol tri(meth)acrylate, trimethylol propane tri(meth)acrylate, pentaerythritol tri(meth)acrylate, pentaerythritol tetra(meth)acrylate and dipentaerythritol hexa(meth)acrylate, wherein said reacting of said mixture to form said polymer is performed in one step.

3. A non-solution method of preparing a soluble branched polymer comprising mixing together a monofunctional monomer having one polymerisable double bond per molecule, with from 0.5–100% w/w, based on the weight of the monofunctional monomer, of a polyfunctional monomer having at least two polymerisable double bonds per molecule and from 0.0001–50% w/w, based on the weight of the monofunctional monomer, of a chain transfer agent and optionally a free-radical polymerisation initiator and thereafter reacting said mixture to form said polymer such that the conversion of monomer to polymer is greater than 90%, wherein said reacting of said mixture to form said polymer is performed in one step.

4. The method of claim 1 wherein said chain transfer agent comprises a monofunctional thiol or a polyfunctional thiol.

5. The method of claim 2 wherein said chain transfer agent comprises a monofunctional thiol or a polyfunctional thiol.

6. The method of claim 3 wherein said chain transfer agent comprises a monofunctional thiol or a polyfunctional thiol.

* * * * *